Inventor
SAMUEL G. ESKIN.
Att'ys

United States Patent Office 2,824,195
Patented Feb. 18, 1958

2,824,195

ELECTRICAL THERMOSTAT

Samuel G. Eskin, Chicago, Ill., assignor to The Dole Valve Company, Chicago, Ill., a corporation of Illinois Application May 3, 1955, Serial No. 505,671

2 Claims. (Cl. 200—140)

This invention relates to improvements in electrical thermostats and more particularly relates to such thermostats adapted to control the operation of room air conditioners and the like.

A principal object of my invention is to provide a simple and positively acting electrical thermostat controlling the supply of power to an air conditioner in accordance with the temperature setting of the thermostat.

Another object of my invention is to provide an electrical thermostat particularly adapted for room air conditioners and connected directly in the main power line to the room air conditioner, and controlling the supply of power thereto in accordance with the temperature setting of the thermostat.

Still another object of my invention is to provide an electrical thermostat particularly adapted to control the line voltage delivered to air conditioners and the like in which a power type of thermal element having a casing in direct association with the atmosphere and a power member extensible therefrom upon predetermined rises in temperature, controls the supply of power to a room air conditioner in accordance with the setting of the thermostat.

Another and important object of my invention is to provide an electrical thermostat controlling the supply of power to a room air conditioner through the main line circuit thereto in which the thermal element is carried on the knob for adjusting the temperature range of the thermostat and is of the relatively long travel power-type of thermal element in axial alignment with a switch member for operating the same.

These and other objects of my invention will appear from time to time as the following specification proceeds and with reference to the accompanying drawing wherein.

Figure 1:
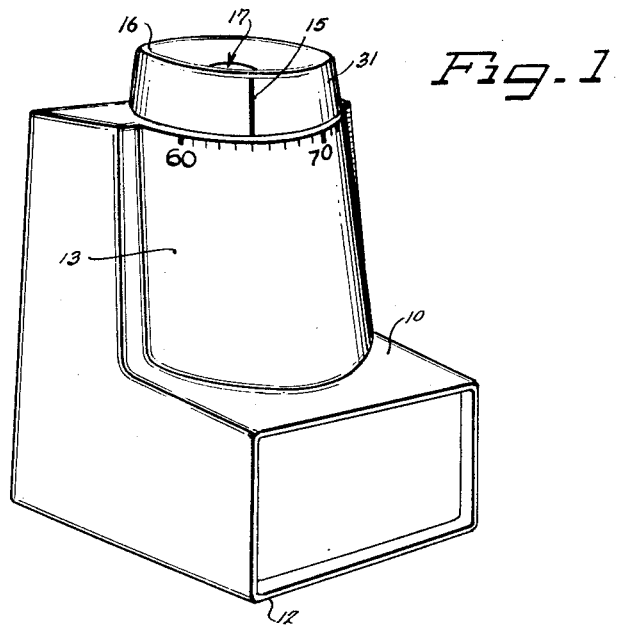
Figure 1 is a perspective view of a thermostat constructed in accordance with my invention.
Figure 2:
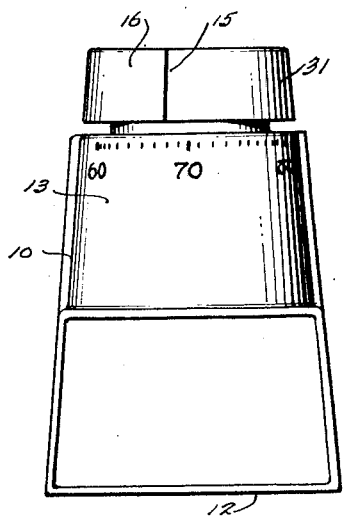
Figure 2 is an end view of the thermostat shown in Figure 1.
Figure 3:
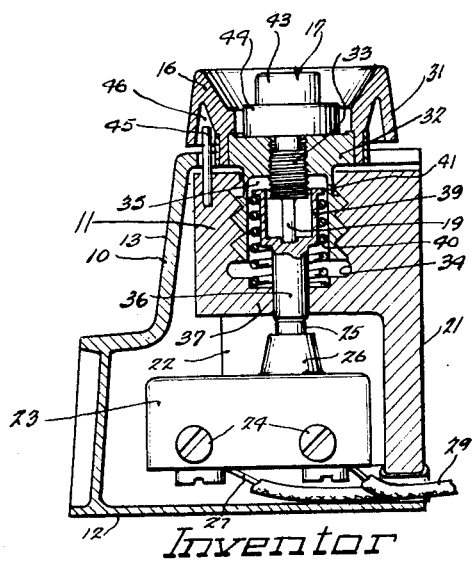
Figure 3 is a vertical sectional view taken through the thermostat.

In the embodiment of my invention illustrated in the drawing, I have shown a housing 10 for a body 11 for the thermostat. The housing 10 may be made from a thermoplastic material and has a base 12 adapted to rest on a window sill, shelf, table or like support in close association with the return air inlet of an air conditioner, and particularly a room air conditioner adapted to be mounted in a window. The housing 10 is shown as having a rearwardly sloping generally semi-cylindrical front wall 13 having temperature indicia at the upper end thereof cooperating with an indexing mark 15 on a knob 16 for adjusting the temperature of operation of a thermal element 17, carried within said knob and having a power member or piston 19 extensible within the body 11 upon predetermined increases in temperature.

The body 11 is shown as having a rear wall 21 and a recessed portion 22 opening toward the front of the housing 10 within which is secured a switch 23, as by machine screws 24.

The switch 23 may be of a well known form of limit or micro-switch having sufficient capacity to take line voltage and make or break the circuit through a main line conductor to a room air conditioner or the like. Said switch, as herein shown, has a depressible operating button 25 movable in a base 26 extending upwardly from the casing thereof and operable to make a circuit upon depression of the operating button 25.

The switch 23 is shown as having two conductors 27 and 29 connected thereto, which may complete a circuit through a main line conductor to a room air conditioner when the switch button 25 is depressed. The conductors 27 and 29 may be connected to an adapter plug (not shown), which may have a room air conditioner plug connected thereto and which makes a circuit through one conductor to the room air conditioner when the switch is closed.

The knob 16 may be made from metal or from a thermoplastic material and is shown as having an outer annular portion 31 within which the thermal element 17 is recessed and as having an inner core or body 32 within which a cylinder 33 for the thermal element 17 is threaded. The core or body 32 is shown as being threaded within a central chamber 34 in the body 11 from the top thereof. The core 32 also has a hollow portion 35 within which the cylinder 33 and power member or piston 19 extend, and within which a plunger 36 is reciprocably movable. The plunger 36 is slidably guided in a wall 37 forming the bottom of the chamber 34. The plunger 36 is shown as being in axial alignment with the button 25 and piston 19, for engaging and depressing said button upon extensible movement of the piston 19 from the cylinder 33.

The plunger 36 is shown as having an enlarged diameter cup-like upper end portion 39, extending around the piston 19 and cylinder 33, the bottom of which is engaged by the end of the piston 19. A compression spring 40 is provided to bias the plunger 36 out of engagement with the button 25 and to return the piston 19 within the cylinder 33, upon predetermined reductions in temperature. The spring 40 is shown as being seated in the bottom of the chamber 34 at one end and against a flange 41 projecting outwardly from the cup-like portion 39 at its opposite end.

The thermal element 17 is shown as being of a so-called wax or power type of thermal element having a casing 43 for a thermally expansible material recessed within the knob 16 and exposed to the atmosphere. A conductor ring 44 extends around the casing 43 and is herein shown as abutting the upper surface of the core 32. The casing 43 contains a thermally expansible material which acts against a membrane or deformable member (not shown) as the thermally expansible material expands to extend the piston 19 from the cylinder 33 upon predetermined rises in temperature. The thermal element is of the same general type as shown and described in the Vernet Patent No. 2,368,181, dated January 30, 1945, and commonly known as a "Vernay" thermostatic element. The thermally expansible material contained within the casing 43 may be of a type such as is shown and described in the Vernet Patent No. 2,259,846, and may be a wax containing a heat conductor, such as, a metal powder and a binder to prevent separation of the metal powder from the wax. The thermally expansible material also may be a wax alone, such as a paraffin wax for low temperature operation or a micro-crystalline wax for higher temperature operation. In the present instance, a paraffin wax having a relatively low melting or fusion point is a preferred thermally expansible material since the fusion point of the thermally expansible material may be at room temperature or below.

A pin 45 mounted in the body 11 and projecting upwardly from the top thereof through the housing 10 within a downwardly opening recessed portion 46 of the knob 16, is provided to limit turning movement of said knob to prevent turning thereof to a position to cause the power member or piston 19 to depress the switch button 25 when in its retracted state with respect to the cylinder 33.

It is clear from the foregoing that adjustment of the operating temperature of the thermal element 17 is attained by turning movement of the knob 16 and the length of travel required for the piston 19 to move the plunger 36 into engagement with the switch button 25, to depress the same to close the switch, it being understood that the longer the travel of the piston 19 required to close the switch, the higher will be the temperature at which the switch will be closed.

It may be seen from the foregoing that I have provided an extremely simple thermostatic control for room air conditioners utilizing an economical and powerful direct acting thermostat carried by the adjusting knob for the thermostat, the power member or piston of which is extensible within a body supporting the switch in direct alignment with the operating button therefor, and that adjustment of the operating temperature of the thermostat may be attained by varying the travel of the power member or piston required to operate the switch, effected by turning movement of the knob within the switch body.

It will be understood that modifications and variations in the present invention may be effected without departing from the spirit and scope of the novel concepts thereof.

I claim as my invention:

1. In an electrical thermostat particularly adapted for air conditioners and the like, a body, a switch on said body adapted to make and break a main line circuit, said switch having a depressible button for operating the same, a knob on the outside of said body having a central recessed portion opening to the outside of said body and having a core threaded within said body and having an open central portion in communication with said recessed portion, a plunger slidably guided in said body and movable within said open central portion of said core, a spring biasing said plunger in a retracted position with respect to said open central portion of said core, and a thermal element carried by said knob having a casing recessed within said recessed portion in contact with the air on the outside of said body, a cylinder threaded within said core and a piston extensible from said cylinder within the open portion of said core and having engagement with said plunger, said operating button, plunger and piston all being in axial alignment to provide a direct driving connection to said button for operating the same upon extension of said piston with respect to said cylinder upon predetermined rises in temperature.

2. An electrical thermostat comprising a support body, an axially apertured rotary adjusting knob threadedly mounted on said body, a thermal element mounted in the axial aperture of said knob for rotation therewith to adjust the temperature of operation of the thermostat, said thermal element comprising a casing having a portion exposed to the atmosphere and a power member extensible with respect to said casing within said body upon predetermined rises in temperature of the air surrounding said exposed portion, and a switch associated with said body and operatively connected in direct axial alignment with said power member.

References Cited in the file of this patent

UNITED STATES PATENTS

| | | |
|---|---|---|
| 2,288,517 | Dubilier | June 30, 1942 |
| 2,289,882 | Myers | July 14, 1942 |
| 2,308,911 | Campodonico | Jan. 19, 1943 |
| 2,493,190 | Fuchs | Jan. 3, 1950 |
| 2,739,204 | Garner et al. | Mar. 20, 1956 |